(12) United States Patent  
Warther

(10) Patent No.: US 8,973,831 B1
(45) Date of Patent: Mar. 10, 2015

(54) STANDOFF RFID ELEMENTS

(71) Applicant: Vanguard Identification Systems, Inc., West Chester, PA (US)

(72) Inventor: Richard O. Warther, West Chester, PA (US)

(73) Assignee: Vanguard Identification Systems, Inc., West Chester, PA (US)

( * ) Notice: Subject to any disclaimer, the term of this patent is extended or adjusted under 35 U.S.C. 154(b) by 5 days.

(21) Appl. No.: 13/858,466

(22) Filed: Apr. 8, 2013

Related U.S. Application Data

(60) Provisional application No. 61/621,269, filed on Apr. 6, 2012.

(51) Int. Cl.
*G06K 19/02* (2006.01)
*G06K 19/077* (2006.01)

(52) U.S. Cl.
CPC .... *G06K 19/07728* (2013.01); *G06K 19/07722* (2013.01)
USPC ........................... 235/488; 235/451; 235/492

(58) Field of Classification Search
USPC ........................... 235/488, 439, 451, 487, 492
See application file for complete search history.

(56) References Cited

U.S. PATENT DOCUMENTS

| | | | |
|---|---|---|---|
| 4,861,644 A | 8/1989 | Young et al. | |
| 6,769,718 B1 | 8/2004 | Warther et al. | |
| 6,994,262 B1 | 2/2006 | Warther | |
| 7,204,652 B2 | 4/2007 | Warther | |
| 7,205,898 B2 | 4/2007 | Dixon et al. | |
| 7,225,993 B2 | 6/2007 | Warther | |
| 7,375,639 B2 | 5/2008 | Dixon et al. | |
| 7,388,504 B2 | 6/2008 | Mess | |
| 7,584,896 B2 | 9/2009 | Warther | |
| RE41,925 E | 11/2010 | Warther | |
| 7,845,569 B1 | 12/2010 | Warther et al. | |
| 7,909,955 B2 | 3/2011 | Warther | |
| 8,052,061 B2 | 11/2011 | Warther | |
| 8,235,300 B2 | 8/2012 | Warther | |
| 2006/0037502 A1 | 2/2006 | Warther | |
| 2006/0124757 A1 | 6/2006 | Warther | |
| 2007/0215711 A1 | 9/2007 | Warther | |
| 2008/0030017 A1 | 2/2008 | Warther | |
| 2009/0009412 A1 | 1/2009 | Warther | |
| 2010/0065648 A1 | 3/2010 | Warther | |
| 2011/0133904 A1 | 6/2011 | Warther | |
| 2011/0226857 A1 | 9/2011 | Warther | |
| 2011/0226861 A1 | 9/2011 | Warther | |
| 2012/0062367 A1 | 3/2012 | Warther | |

*Primary Examiner* — Sonji Johnson
(74) *Attorney, Agent, or Firm* — Panitch Schwarze Belisario & Nadel LLP

(57) ABSTRACT

A standoff RFID element includes a generally planar, hollow, standoff member with a pair of major outer walls connected by a plurality of structural components like ribs and at least a first piece of flexible, planar, non-conductive polymer substrate having one major side bonded with a major side of the standoff member. An RFID inlay is encapsulated between the hollow member and the piece of polymer substrate. The hollow member is formed from a non-conductive, non-porous, polymer material. The flexible substrate is non-conductive and substantially porous.

23 Claims, 2 Drawing Sheets

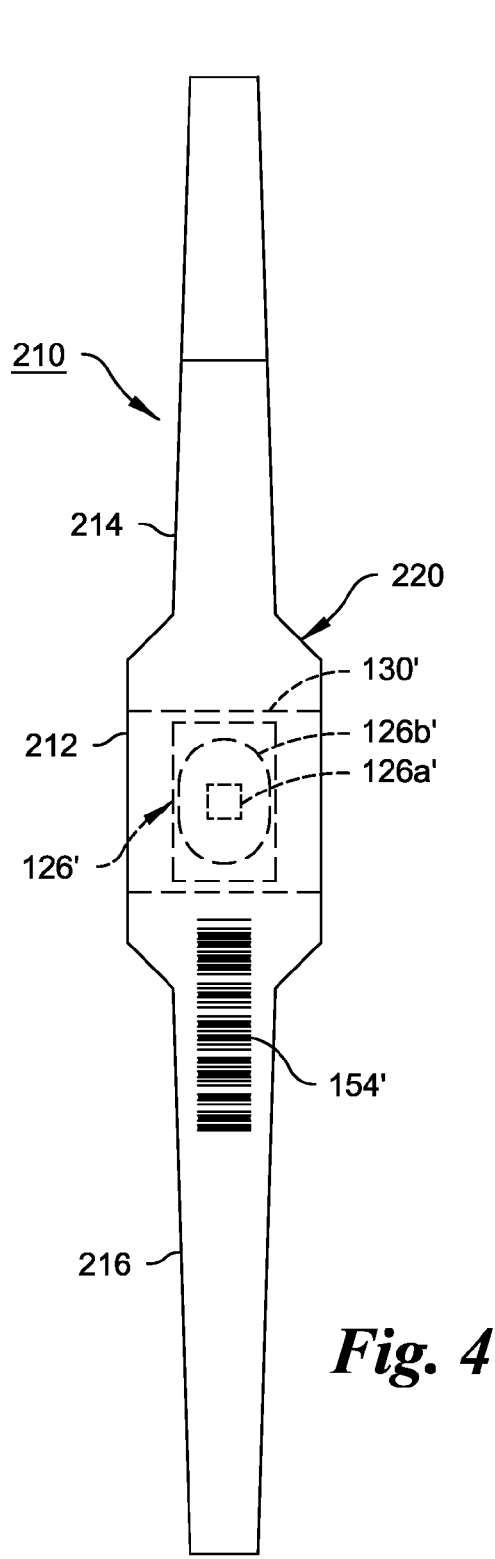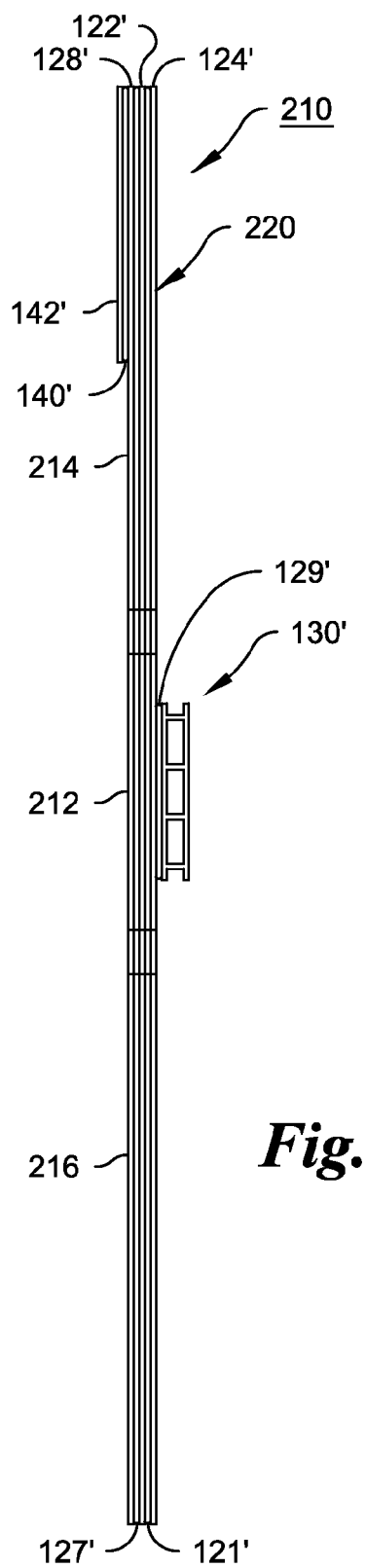

STANDOFF RFID ELEMENTS

CROSS REFERENCE TO RELATED APPLICATIONS

The present application is related to provisional U.S. Patent Application No. 61/621,269 filed Apr. 6, 2012 and incorporated by reference herein in its entirety.

BACKGROUND OF THE INVENTION

RFID elements include tags and labels and have many uses including inventory control. Many different manufacturers have been attempting to find a solution for tagging metal and liquid containing objects utilizing ultra high frequency UHF RFID inlays. These inlays can typically be read at greater distances (many meters) than can the older, high frequency (HF) RFID inlays but, as a result, can interact with metals or certain other materials if in close proximity.

Traditionally RFID on metal tags have been embedded inside of durable plastics through an injection molding process, using a technique called "in-mold embedded". This requires the manufacturer to open the mold die up and to place the RFID inlay inside of the injection mold die prior to injecting the molten plastics around the inlay. Because the inlay becomes exposed to relatively high temperatures from molten plastics, a significant portion of the inlays are destroyed because of the excessive heat. It is also a very labor intensive process that requires handling of these tags individually one at a time. Typical in-mold RFID on metal tags are made of ABS polycarbonates and usually surround the RFID inlay with a significant amount of material to give it a robust durable characteristic.

Others have incorporated ferro-magnetic materials and all sorts of magnetic coatings to enhance the read range of an RFID inlay when attached to metal. To a certain extent these approaches become successful but they are relatively expensive materials to work with.

BRIEF SUMMARY OF THE INVENTION

In one aspect, the invention is a standoff RFID element comprising: a one-piece, generally planar, hollow, standoff member including a pair of major outer walls forming a pair of major outer sides of the member and separated by a plurality of structural components extending between the outer walls, the outer walls and structural components being formed from a non-conductive, non-porous, polymer material and forming visibly large voids between the outer walls; a first piece of flexible, planar, non-conductive polymer substrate having one major side permanently fixed with the standoff member on one major planar side of the standoff member, the first piece of substrate being a porous polymer material; and an RFID inlay responsive to radio frequency interrogation encapsulated between the generally planar, hollow, standoff member and the piece of flexible, planar, non-conductive polymer substrate.

In another aspect, the invention is a method of making the aforesaid RFID standoff element comprising the steps of: encapsulating a plurality of RFID inlays between one piece of the generally planar, hollow, standoff element polymer material and a layer of the flexible, planar, non-conductive polymer substrate material to make a composite sheet product; and cutting the standoff RFID element from the composite sheet product.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

FIG. 4 is a perspective view of a third embodiment standoff RFID in the form of a band for attachment to the limb of a wearer; and FIG. 5 is diagrammatic cross-section of the RFID band of FIG. 4.

DETAILED DESCRIPTION OF THE INVENTION

Figure 1:
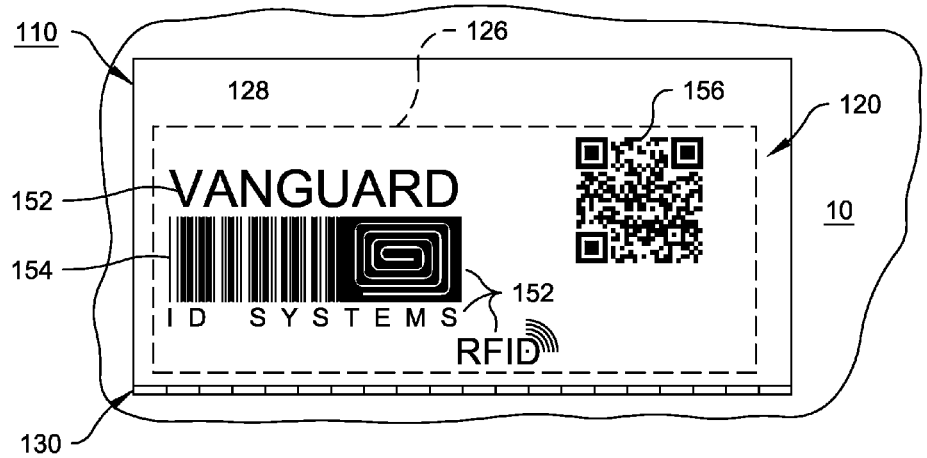
FIG. 1 is perspective view of a preferred, first embodiment, standoff RFID tag for attachment to metal objects.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the stated component and designated parts thereof. The terminology includes the words above specifically mentioned, derivatives thereof and words of similar import.

Figure 2:
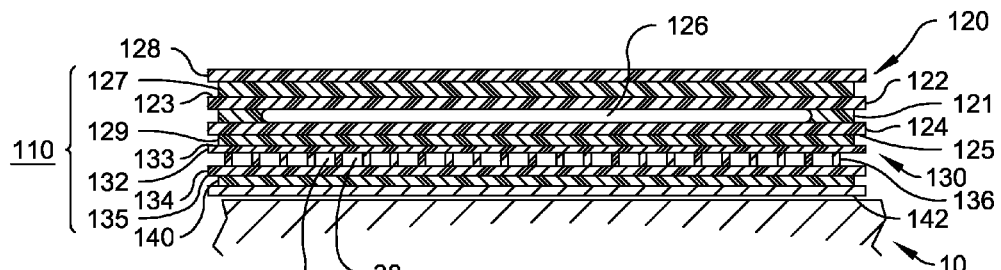
FIG. 2 is diagrammatic cross-section of the RFID tag of FIG. 1.

FIGS. 1 and 2 depict diagrammatically a standoff RFID element of the present invention in the form of a tag 110 to be applied to objects 10, such as conductive metal objects or containers of fluid or metal containers holding fluids, typically to identify the objects or fluids via non-contact radio interrogation. The tag 110 includes an RFID inlay 126 (in phantom and not to scale) which is an assembly including an integrated circuit chip and antenna, preferably UHF but possibly other frequencies including HF and those which might become commercially available in the future, encapsulated between first and second pieces of permanently joined together flexible, planar, non-conductive, polymer substrate pieces 122, 124, forming a planar body 120. The term "non-conductive" refers to electrically non-conductive. One suggested UHF RFID inlay suggested for use is an Avery Dennison 843; it has major dimensions of 3.7×1.5 inches and a footprint slightly larger for die cutting. The resulting body 120 is permanently fixed to one major side 135 of an at least generally planar, non-conductive, hollow standoff member 130.

At least one and preferably both of the first and second pieces of flexible, polymer substrate 122, 124 forming the body 120 are of a uniform composition throughout and substantially porous, with a porosity greater than fifty percent. At least one and preferably both of the two pieces of substrates 122, 124 are planar, porous polymer web stocks such as Teslin® of PPG Industries, Pittsburgh, Pa., or Artisyn® of Daramic, Inc., Charleston, S.C. Both are "microvoided", polysilicate flexible sheet materials. Teslin® is described in detail in U.S. Pat. No. 4,861,644 incorporated by reference herein. Teslin® is substantially porous with a porosity greater than fifty percent, reportedly about sixty-five percent. The porosity is microscopic in size and not visible to the naked eye. It is formed by microscopic voids distributed uniformly through the substrate. It is also sufficiently flexible to be commercially supplied on rolls having cores of only six inches in diameter. Preferably two pieces 122, 124 of the flexible, porous polysilicate planar substrate of identical composition are permanently bonded together around the RFID inlay 126 with a layer 121 of suitable adhesive material to form the body 120 encapsulating the inlay 126. A suitable adhesive for Teslin® is WC9-PL, a heat activated, water based polyurethane adhesive of the Thornley Company of Wilmington, Del. The microvoided substrate material is superior to non-porous polymer materials like PVC, PC, PPE, PE and the like conventionally used for encasing RFID transponder inlays in plastic tags because, among other reasons, the porous substrate material readily collapses over the inlays without damage to the inlays when the substrates 122, 124 are heated and pressed to laminate them together. They further provides cushioning protection to the inlay in use.

According to the invention, one major side 125 of the body 120, formed by one major outer surface of the two flexible substrates 124, is permanently fixed to a major outer surface of a first major side 133 of the non-conductive, hollow standoff member 130, preferably also by bonding with an adhesive layer 129, with the RFID inlay 126 thereby also captured and encapsulated between the hollow standoff member 130 and the first piece of flexible polymer substrate 122 distal to that member 130. A layer of an adhesive 140, preferably a pressure sensitive adhesive, is applied to the outer surface of a remaining major side 135 of the hollow standoff member 130, distal to the body 120 and first and second pieces of flexible substrates 122, 124, with a cover strip 142 so as to be exposable on that remaining side 135 by removal of the cover strip 142.

The non-conductive, hollow standoff member 130 is preferably an extruded, non-conductive polymer planar sheet stock material, more preferably like a commercially available material sold under the trademark Coroplast®. This relatively inexpensive, plastic sheet material is used routinely in the signage industry and elsewhere. Coroplast® sheet stock is extruded to form a substantially hollow structure with a pair of planar, parallel major outer walls 132, 134 forming major planar outer sides 133, 135, respectively, of the element 130, and a plurality of regularly spaced ribs 136 extending between the planar walls 132, 134, so as to connect the planar walls and define a series of visibly open shafts (i.e. tunnels, bores, flutes, passageways) 138 extending continuously along the extruded length of the product. The sheet stock is very hollow with the open shafts taking up eighty percent or more of the transverse cross-sectional area of element.

The walls 132, 134 and ribs 136 are "structural components" of the element 130 and are themselves formed from a non-porous polymer material. The structural components 132, 134, 136, the open shafts 138 and the entire cross-sectional geometry of the member 130 are uniform along their extruded lengths and therefore the element 130 is essentially identical in planes perpendicular to its extruded length and to the planes of the walls 132, 134 and ribs 136. While rectangular open shafts are typically provided commercially, other extruded hollow/open shaft geometries including but not limited to conventional sinusoidal corrugations and angled trusses are possible. Commercially available Coroplast® hollow sheet stock material is formed from proprietary, high impact polymer blends, primarily polypropylene blends but polycarbonate (PC) blends are also available. Filled and composite materials might also be extruded to form hollow sheets of standoff member material. Coroplast® hollow sheet stock material comes in different heights between the major planar outer walls 132, 134. While a height of two millimeters was found to offer some improvement in reading range, a height of four millimeters was found to provide a superior interrogation range verses the height of only two millimeters. Accordingly, a height of at least two millimeters is recommended for any standoff element of the present invention and of greater than two millimeters is preferred.

While both the flexible polymer substrates 122, 124 and the standoff member 130 might be described as being substantially "hollow", the visibly open shafts formed by non-porous structural components take up ninety percent or more of the cross-sectional area of the standoff members 130 and are to be contrasted with the microscopic voids of the polymer substrates 122, 124, which voids are dispersed uniformly throughout the polymer material itself. The term "hollow" as used herein will refer to the presence of open shafts or other openings or voids sufficiently large as to be visible to the naked eye and formed by non-porous structural members while the terms "pore" and "porous" shall refer to voids which are microscopic in size and within the structural polymer material itself.

While the flexible, polymer substrate sheets or webs 122, or 122, 124 conceivably may be laminated together with the sheet/web forming the protective outer cover strip 128 and sheet forming the standoff members 130 in one laminating step, more preferably various layers combined in separate, consecutive steps to form a composite sheet product containing a plurality of RFID inlays and individual RFID standoff elements still connected together in one piece. Preferably, multiple RFID inlays positioned between sheets or layers of the porous, flexible polymer material forming the substrates 122, 124, with or without a protective outer cover strip 128 of a flexible, non-porous polymer film such as PP or PE, may be assembled by one of the methods described, for example, in US Patent Application Publication US 2011-0226857-A1 and US 2010-0065648-A1, each incorporated by reference herein in its entirety. The sheets or continuous webs of multiple inlays 126 may then be applied and permanently fixed to one major surface 133 of a sheet of the rigid, hollow, extruded polymer sheet standoff material 130 by an applied adhesive layer as depicted or the use of a double adhesive sided, polymer film, transfer tape (not depicted). A web or piece of pressure sensitive adhesive coated cover sheet 142 is applied to the remaining major side 135 of that standoff material 130 distal to the one major surface 133 supporting the bodies 120 and inlays 126. Individual tags 110 are then severed from the larger composite product.

Standoff members 130 formed with non-porous, polymer structural components are superior to "foam board" and cardboard in weather resistance, the latter two deteriorating when wet or exposed to a moist environment.

A further advantage is that Coroplast® sheet stock can also withstand being cut with a steel rule die cutter, which is also ideal for use on the other polymer materials 122, 124 and 130 forming the remainder of the element 110. Thus, elements 110 can be made using the same equipment used to make just the RFID bodies 120. While foam board and cardboard may also be cut with a steel rule die, given the relatively small size of the subject RFID elements 110 (less than six inches square and more typically less than half that in area), both are subject to more extensive crushing and permanent deformation, resulting in uneven and unpredictable heights. Foam board is normally cut with a spinning blade to avoid crushing and leave a reasonably clean edge, which is a much slower process. The Coroplast® sheet stock is sufficiently rigid that any crushing is essentially limited to the partial shafts that remain when the material is cut in the extruded direction.

Another advantage elements of the present invention have over those of injection molding is the ease in printing on or otherwise decorating the product. By using microvoided polymer material, conventional four color printing and decorating techniques as well as machine writable code, that is to say variable data, can easily be applied to the exposed major outer surface 123 of the outermost sheet 122. Printing would typically be applied before combining with the standoff member 130 but could be applied afterwards. In addition to or instead of conventional computer generated graphics, including static images 152 that might be repeated from element to element, various character sets (e.g. ASCII) and bar codes, either one dimensional 154 or two dimensional 156, can be laser printed with great detail on the preferred, microvoided polymer sheet(s) 122. A unique identification code, for example one assigned to and electronically stored in each individual RFID inlay, can be printed in alphanumeric characters, in bar code, for example, embedded as part of bar code 156, or both. The printed code(s) can be used as a back-up identification technique in the event that the RFID inlay was unserviceable. In addition or the alternative, a UPC or other proprietary code may be printed on the tag 110, for example, in linear bar code 154, identifying the object 10 supporting the tag 110 or its contained fluid.

Also, the speed of operation of conventional graphic arts printing, lamination and steel rule cutting equipment far exceeds anything that can be done by the much more labor intensive injection molding manufacturing technique that requires the cleaning of mold skim and handling each individual RFID inlay in and RFID element out of an injection mold, even if the RFID elements were to be molded in gangs. As a result of being able to use the same equipment and steps used to fabricate RFID tags without standoff members, capital outlay for molding equipment is avoided, throughput of the elements 110 is much faster and the cost of materials much less than those of injected molded elements. The Coroplast® hollow construction further provides a standoff layer density that is far less than that of the solid injection mold technique used by the rest of the industry so that the resulting elements 110 are also much lighter.

Figure 3:
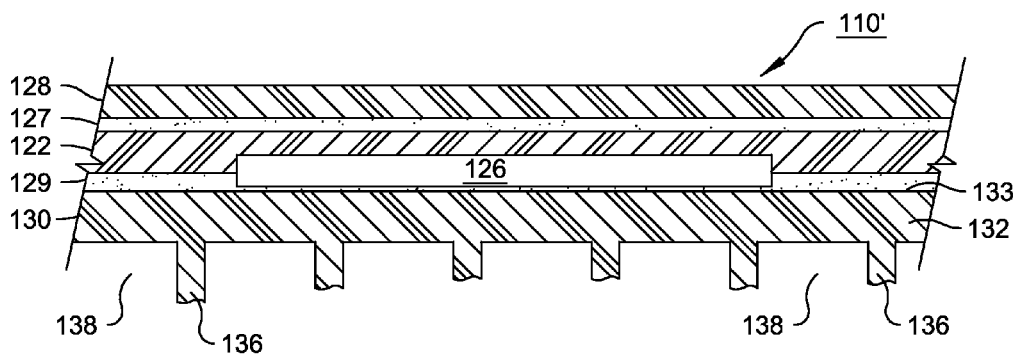
FIG. 3 is diagrammatic cross-section of part of a second embodiment RFID tag.

FIG. 3 depicts in cross-section another standoff tag 110' construction. It will be appreciated that a web or sheet forming the flexible porous substrate 122, with (or without) protective non-porous cover strip 128, can be permanently fixed directly to hollow stock standoff sheets with RFID assemblies captured there between, again using conventional web or sheet laminating techniques and equipment used to make the RFID inlay bodies 120 themselves. Tag 110' is identical to tag 110 in outward appearance. Only the second porous polymer substrate 124 and one layer of adhesive 121 have been eliminated. The one remaining flexible porous polymer substrate 122 is permanently fixed to the one major side 133 of the non-conductive, hollow standoff member 130, preferably by bonding with adhesive layer 129, and the RFID inlay 126 thereby captured and encapsulated between the two, the non-electrically conductive, hollow standoff member 130 and the one flexible porous polymer substrate 122. Again, a flexible polymer transfer tape with adhesive on both sides may be conveniently used in place of an amorphous adhesive layer 129 to bond the porous polymer substrate 122 to the hollow standoff member 130. Again, a non-porous, transparent flexible protective film 128 is preferably permanently fixed to the outer surface 123 of the substrate 122 by an adhesive layer 127 and a layer of pressure sensitive adhesive 140 with removable cover sheet 142 is applied to the remaining major side 135 of the member 130.

FIGS. 4 and 5 depict the invention incorporated into an RFID limb band 210, a wristband or ankle band. Contact with moisture also creates reading problems with RFID tags and sweat is a problem that arises when the tags are provided as wristbands. The invention inexpensively raises the RFID inlay 126 away from a person's skin to improve the reading range of the inlay 126.

Referring to FIG. 4, the device 210 has a flexible polymer body 220 that includes a main portion 212 and a pair of opposing, flexible polymer strip arms 214, 216 extending from opposing lateral edges of the main portion 212, each arm forming at least part of a limb attachment band. The arms 214, 216 are themselves formed portions of whatever piece(s) of flexible, planar, non-conductive polymer substrates and films 122'/124'/128' are provided to form the body 220. An RFID inlay 126' (in phantom) is encapsulated within the body 220 or between the body 220 and the standoff member 230. RFID inlay 126' also includes integrated circuit chip 126a' and antenna 126b'. Inlay 126' is preferably HF and is, generally speaking, smaller in size/area but much shorter in range than a UHF inlay like inlay 126. The pressure sensitive adhesive layer 140' and cover strip 142' may be provided on either major surface of the device 210, suggestedly on one of the arms 214. Also, the depicted, non-electrically conductive hollow standoff member 130' is now smaller in size but still underlies the main portion 212 of the body 220 directly opposite the RFID inlay 126'. It will be appreciated that all of the polymer components of the device 210 including the non-electrically conductive hollow material used to form the standoff member 130, may be provided in continuous strips to form what would be a plurality of adjoining devices 210 in a larger composite sheet product from which could be cut plural individual bands 210.

Alternatively, a different band device can be provided with just a main portion containing the RFID inlay and a single flexible polymer strip arm formed by a portion of the flexible polymer substrates/strips 222, 224, 228 forming the body and of a sufficient length to be wrapped completely around the identified limb of a wearer and to at least partially overlap the main portion. The layer of pressure sensitive adhesive with protective, removable cover strip can be provided on either major side of the arm, as desired, to secure the distal end of the arm over or under the main portion, or to the main portion to receive and secure the distal end of the arm.

Again, the porous polymer substrate layer 124' and adhesive layer 121' might be eliminated and the remaining porous polymer substrate 122' bonded directly to the hollow standoff member 130' by adhesive layer 129' or double adhesive sided transfer tape. Still other band constructions can be adopted to the use of the described materials. Other constructions are described in co-pending applications of the present inventor, U.S. patent application Ser. No. 11/967,502 filed Dec. 31, 2007 and Ser. No. 12/951,749 filed Nov. 22, 2010, both incorporated by reference herein in their entireties.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. For example, while relatively rigid extruded hollow sheet materials are preferred for use as the standoff structure, other, non-electrically conductive hollow sheet materials can be used. For example, conventional bubble wrap sheet material with substantial internal sealed air voids formed by non-porous but flexible polymer structural components might be used for the standoff structure. Continuous body sheets or web of regularly spaced, polymer substrate encased, RFID inlays would be made initially and the body sheets/web thereafter permanently joined with adhesive to one major side of a sheet or web of bubble wrap. A release sheet bearing a layer of pressure sensitive adhesive would be joined to remaining major side of the bubble wrap and the composite sheet thereafter cut with steel rule die(s). The smaller "bubbles" are preferred for strength and still provide adequate height (more than two millimeters) for improved RFID inlay performance. The sheet/web of polymer encased inlays may be given some rigidity by the provision of at least one layer of a selectively thick, non-porous flexible polymer film to encase the inlays with a layer of the porous flexible polymer substrate or the provision of one or two such non-porous films as outer cover layers over one outer side or both outer sides of a pair of the porous flexible substrates encasing the inlays. The basic invention comprises an RFID inlay captured and encapsulated between a non-metallic, hollow standoff member and another adhered porous polymer sheet.

The invention claimed is:

1. A standoff RFID element comprising:
   a one-piece, generally planar, hollow, standoff member including a pair of major outer walls forming a pair of major outer sides of the member and separated by a plurality of structural components extending between the outer walls, the outer walls and structural components being formed from a non-electrically conductive, non-porous, polymer material and forming visibly large voids between the outer walls;
   a first piece of flexible, planar, non-conductive polymer substrate having one major side permanently fixed with the standoff member on one major planar side of the standoff member, the first piece of substrate being a porous polymer material; and
   an RFID inlay responsive to radio frequency interrogation encapsulated between the generally planar, hollow, standoff member and the piece of flexible, planar, non-conductive polymer substrate.

2. The standoff RFID element of claim 1 wherein the pair of outer walls of the standoff member are planar parallel and are formed together with the structural components in the form of ribs by extrusion so the standoff member has a uniform transverse cross-sectional configuration in planes perpendicular to the ribs and the outer walls.

3. The standoff MID element of claim 2 wherein the first piece of substrate has a uniform composition throughout and a porosity of more than fifty percent by volume formed by microscopic voids distributed uniformly throughout the substrate.

4. The standoff RFID element of claim 3 further comprising printing on a remaining major side of the first piece of substrate.

5. The standoff RFID element of claim 4 wherein the printing includes a unique identification code assigned to the individual RFID inlay in the element.

6. The standoff RFID element of claim 5 wherein the unique identification code is printed in at least a bar code format.

7. The standoff RFID element of claim 4 further comprising a piece of non-porous, transparent flexible polymer film permanently fixed to the remaining major side of the first piece of substrate over the printing.

8. The standoff RFID element of claim 2 wherein spacing between the major planar outer sides of the member is at least two millimeters.

9. The standoff RFID element of claim 1 further comprising a second piece of flexible, planar, non-conductive polymer substrate located between the standoff member and the RFID inlay and bonded with each of the standoff member and the first piece of substrate such that the first piece of substrate is bonded with the standoff member through the second piece of substrate and the RFID inlay is further encapsulated between the first and second pieces of substrate.

10. The standoff RFID element of claim 9 wherein the second piece of substrate is identical in composition to the first piece of substrate.

11. The standoff RFID element of claim 1 wherein the pair of major outer walls are parallel to each other and the structural components are ribs formed together with the pair of major outer walls in one monolithic piece from a high impact, non-electrically conductive, non-porous, polymer material, the ribs extending transversely to the pair of major walls between inner facing major sides of the pair of major outer walls from the inner facing major side of one of the pair of major outer walls to the inner facing major side of a remaining one of the pair of major outer walls to connect the facing inner sides and major walls together and to define a series of open shafts extending continuously and completely through the standoff member in directions parallel to the parallel major outer walls, and wherein the material of first piece of polymer substrate is microporous with voids microscopic in size located within the polymer material itself, the first piece of polymer substrate being located outside the standoff member, adhered on one of the pair of major outer sides of the standoff member with the RFID inlay located between the standoff member and the first piece of substrate.

12. The standoff RFID element of claim 11 further comprising a layer of pressure sensitive adhesive under a removable cover strip on a remaining one of the pair of major sides of the standoff member facing away from the RFID element and the first piece of substrate.

13. The standoff RFID element of claim 1 further comprising a pressure sensitive adhesive layer exposable on a remaining one of the major outer sides of the standoff member distal to the RFID inlay.

14. A method of using the RFID element of claim 13 comprising the steps of:
   removing a protective cover strip from the pressure sensitive adhesive layer to expose the adhesive layer on the element;
   applying the exposed adhesive layer of the element to an object of metal or containing a liquid or of metal and containing a liquid.

15. A method of making the standoff RFID element of claim 1 comprising the steps of:
   encapsulating a plurality of RFID inlays at least between one piece of the generally planar, hollow, standoff element polymer material and at least one layer of the flexible, planar, nonconductive polymer substrate material to make a composite sheet product; and
   cutting the standoff RFID element from the composite sheet product with a steel rule die.

16. The method of claim 15 further comprising the step of applying a pressure sensitive adhesive layer with protective cover sheet to a major side of the one piece of the generally planar, hollow, standoff element polymer material before the cutting step.

17. The method of claim 15 wherein the encapsulating step comprises initially encapsulating the plurality of RFID inlays between a pair of polymer material sheets; and thereafter permanently fixing the pair of polymer material sheets with encapsulated RFID inlays to a major side of the one piece of the generally planar, hollow, standoff element polymer material.

18. The method of claim 17 wherein in the initially encapsulating step, at least one of the pair of polymer sheets is substantially porous with a porosity formed by microscopic voids dispersed uniformly through the polymer to form the first piece of flexible, planar, non-conductive polymer substrate of each resulting element.

19. The method of claim 15 wherein the cutting step comprises cutting the RFID standoff element with a main portion including the RFID inlay and the standoff member an arm formed by at least some of the piece of flexible, planar, non-conductive polymer substrate extending away from one lateral edge of the main portion so as to form at least part of a limb attachment band.

20. The method of claim 19 further comprising the step of providing a layer of pressure sensitive adhesive under a removable cover strip to one major outer side of the flexible, planar, nonconductive polymer substrate material of the composite sheet product away from the hollow standoff element material before the cutting step and wherein the cutting step comprises providing at least a portion of the layer of pressure sensitive adhesive under the removable cover strip on the arm portion of the piece of flexible, planar, non-conductive polymer substrate of the standoff element cut from the composite sheet product.

21. A method of using a standoff RFID element including a) a planar, hollow, standoff member including a pair of parallel major outer walls forming a pair of major outer sides of the member and separated by a plurality of ribs extending transversely between inner facing sides of the pair of outer walls to define and maintain a series of open shafts extending continuously and completely through the standoff member between the major outer walls in a direction parallel to the major outer walls, the pair of major outer walls and the plurality of ribs being formed together in one monolithic piece from a high impact, non-electrically conductive, non-porous, polymer material, b) a first piece of flexible, planar, non-conductive, microporous polymer sheet substrate located outside the standoff member and having one major side permanently fixed with one of the pair of major outer sides of the standoff member, c) an RFID inlay responsive to radio frequency interrogation encapsulated between the one major outer side of the standoff member and the first piece of polymer sheet substrate, d) a pressure sensitive adhesive layer on a remaining one of the pair of outer major sides of the standoff member distal to the RFID inlay and e) a removable protective cover strip on the pressure sensitive adhesive layer, the method comprising the steps of:
  removing the protective cover strip from the pressure sensitive adhesive layer to expose the adhesive layer on the element; and
  applying the exposed pressure sensitive adhesive layer of the element to an object of metal or containing a liquid or of metal and containing a liquid to adhere the element to the object.

22. A method of making a plurality of standoff RFID elements comprising the steps of:
  providing a planar, hollow, monolithic sheet stock member formed in one piece from a high impact, non-electrically conductive, non-porous, polymer material and including a pair of parallel major outer walls forming a pair of major outer sides of the member and a plurality of ribs of the member extending transversely between inner facing sides of the pair of major outer walls to connect the inner facing sides and the major outer walls together and define and maintain a series of open shafts extending continuously and completely through the sheet stock member between the major outer walls in a direction parallel to the major outer walls;
  encapsulating between one of the pair of major outer sides of the sheet stock member, and a first sheet of flexible, planar, non-conductive, microporous polymer substrate, a plurality of RFID inlays, each responsive to radio frequency interrogation, by permanently fixing one major side of the first sheet with the one of the pair of major outer sides with the plurality of RFID inlays located there between to form a composite sheet product with the plurality of RFID inlays; and
  cutting a plurality of standoff RFID elements from the composite sheet product with a steel rule die, each standoff RFID element including a one-piece, planar, hollow standoff member cut from the sheet stock member and one of the plurality of RFID inlays encapsulated between the cut standoff member and a cut portion of the first sheet of the microporous polymer substrate.

23. The method of making standoff RFID elements according to claim 22 wherein the encapsulating step comprises the steps of:
  initially encapsulating the plurality of RFID inlays between the first sheet and a second sheet of flexible, planar, non-conductive, microporous polymer substrate by permanently fixing together major sides of the first and second sheets of flexible, planar, non-conductive, microporous polymer substrate around the plurality of RFID inlays; and
  adhering a remaining, exposed major side of the second sheet of flexible, planar, non-conductive, microporous polymer substrate with the one of the pair of major outer sides of the planar, hollow, monolithic sheet stock member such that the second sheet and the plurality of RFID inlays are located between the first sheet and the monolithic sheet stock member to form the composite sheet product.

* * * * *